Patented May 13, 1941

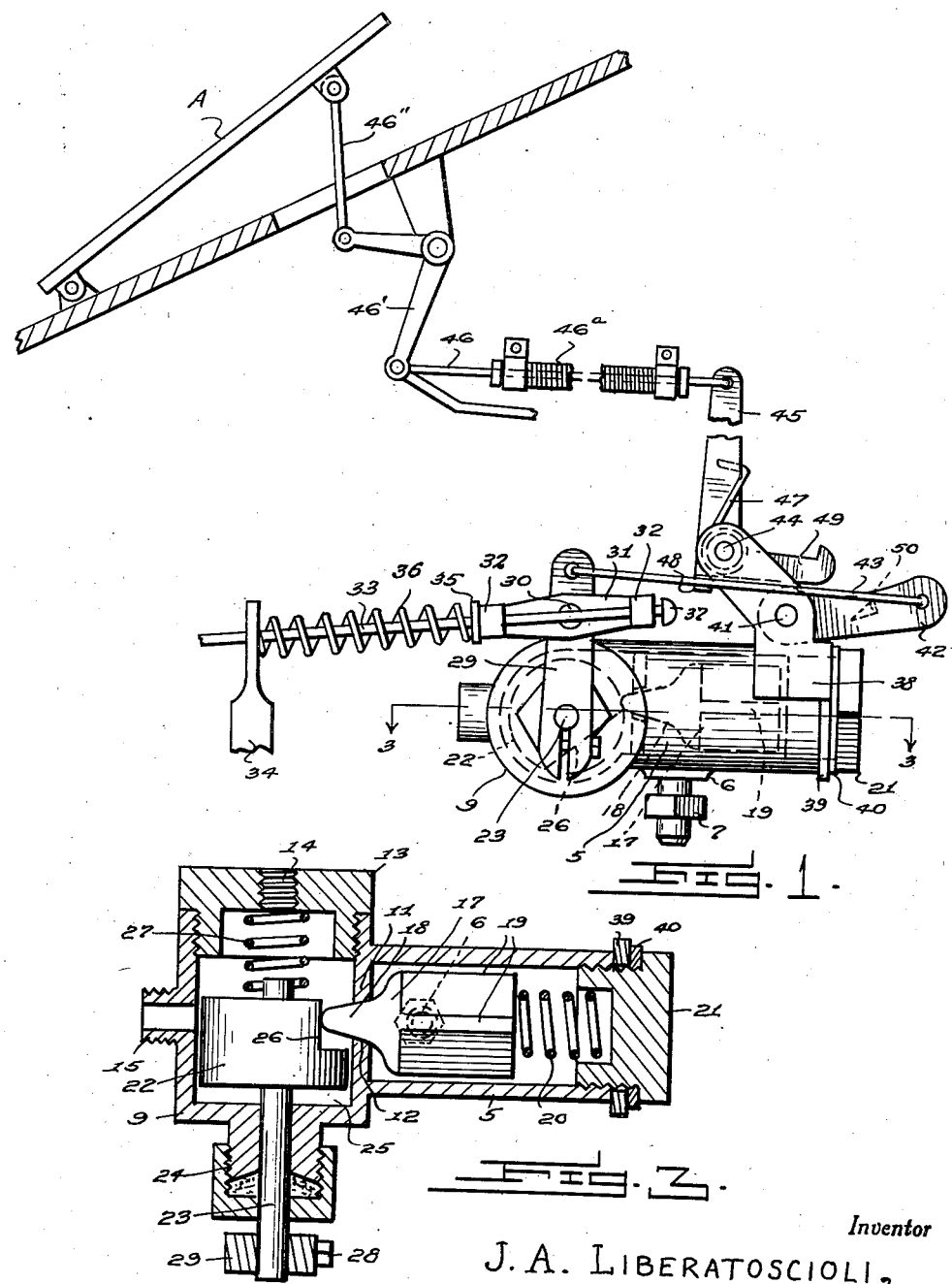

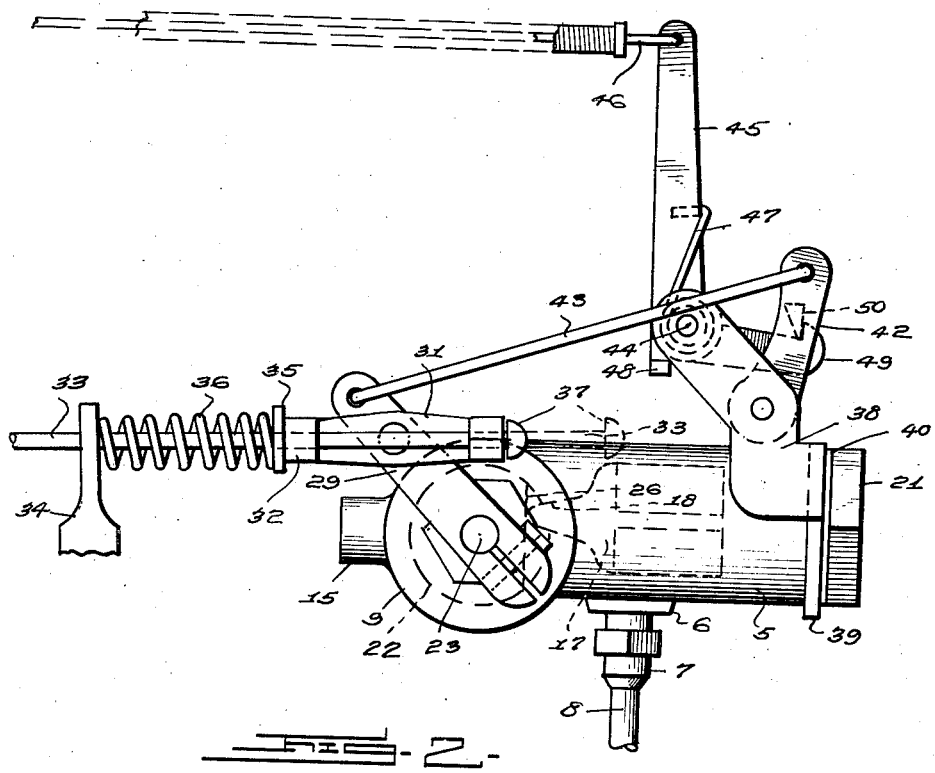

2,241,407

UNITED STATES PATENT OFFICE 2,241,407

CONTROL MECHANISM FOR HYDRAULIC AND/OR AIR BRAKES

John A. Liberatoscioli, Pittsburgh, Pa.

Application August 30, 1939, Serial No. 292,703

2 Claims. (Cl. 192—.01)

This invention relates broadly to brake mechanisms, and particularly to such mechanisms as embody as an operating medium therefor either oil or air; and more particularly the invention has reference to a control mechanism for such vehicular brake systems.

In accordance with the present invention means is provided for controlling such brake systems from the clutch and foot accelerator pedals respectively, forming part of the usual automotive vehicle equipment.

The invention together with its objects and advantages will be best understood from a study of the following description taken in connection with the accompanying drawings, wherein:

Figure 1 is a side elevational view of the brake control mechanism with the parts thereof shown in inoperative position as when the clutch pedal is not depressed and the valve is open.

Figure 2 is a view similar to Figure 1 but with the parts shown in operative position as moved by depression of the clutch pedal.

Figure 3 is a detailed sectional view taken substantially on the line 3—3 of Figure 1.

Figure 4 is a sectional view, through the valve casing and associated parts and showing the valve and the actuator cam therefor in elevation and with the parts in the position shown in Figure 1.

Figure 5 is an end elevational view of the valve shown in Figure 4.

Referring more in detail to the drawings, it will be seen that in accordance with the present invention there is provided a valve casing 5 that is adapted to be disposed in the brake system, having an outlet 6 coupled as at 7 to a conduit 8 that serves to feed the fluid to the individual wheel brakes.

At one end thereof the cylinder 5 is formed integral with a cylinder 9 forming a chamber 10 that is separated from the chamber of the cylinder 5 through the medium of a partition wall 11 having a port 12 therein communicating the chamber 10 with the chamber of the cylinder 5.

For the cylinder 9 there is provided a plug or cap 13 equipped with a threaded part 14 that is designed to be connected with a conduit leading to a stop signal. A threaded nipple 15 is formed on a side part of the cylinder 9 and is adapted to be threaded in the part of the master cylinder of the brake system.

The port 12 is controlled by a valve 17 that has a substantially conical part 18 that normally engages and seats in the port 12 for cutting off the return flow of fluid from the cylinder 5 to the chamber 10.

The valve 17 is of a shape clearly shown in Figures 4 and 5, including a substantially rectangular hollow body which at one end merges into the conical extension 18. The corners of the body are beveled as shown at 19.

The end 18 of the valve 17 is yieldably engaged in the port 12 through the medium of a coiled spring 20 interposed between one end of the body of the valve 17 and a plug 21 closing an end of the cylinder 5.

Arranged within the chamber 10 is a valve operating cam 22 that is provided on one end of a shaft 23 journaled in a gland 24 provided therefor at one end of the cylinder 9. Interposed between the wall of the chamber 10 at said one end and the cam 22 is a washer 25 of suitable material.

The cam 22 is provided with a cam notch 26 that accommodates the end 18 of the valve 17 in a manner to permit full seating of said valve when the cam 22 is in the position as shown in Figures 2 and 3.

Interposed between the cam 22 and the plug 13 is a coiled spring 27 that acts to normally urge the cam 22 towards one end of the chamber 10 and to set up a resistance against too free positive movement of the cam 22.

Clamped on the end of the cam shaft 23 as at 28 is an arm 29.

Pivoted to the arm 29 as at 30 is a rocker 31 that is provided with guides 32 disposed adjacent the responsive opposite ends of the rocker.

The guides 32 accommodate a control rod 33 that at one end is adapted to be connected to the clutch pedal of the motor vehicle.

For the rod 33 there is provided a suitable guide 34 and interposed between the guide 34 and a collar 35 loosely fitting about said rod is a coiled spring 36. The collar 35 normally bears against an adjacent guide 32, and on the free end of the rod 33 is a head 37 which, when the rod 33 moves in a direction in response to the depressing of the clutch pedal, engages a guide 32 for transmitting movement of the rod, through the rocker arm 31 to the arm 29 for rotating the cam 22 in a manner to cause the seating of the valve 17.

Further in accordance with the present invention there is provided a bracket 38 that is integral at one end thereof with a disk 39. The disk 39 is clamped in position at one end of the cylinder 5 between the free end of the cylinder and the flange of the plug 21 provided for said end of the cylinder.

As shown in Figure 3 there is interposed between the disk 39 and the flange of the plug 21, a washer 40.

Pivoted on the bracket 38 as at 41 is a keeper-arm 42. One end of the keeper-arm 42 is connected with the arm 29 through the medium of a link 43.

The bracket 38 also has pivoted thereto as at 44 a lever 45 that is connected through the medium of a wire 46 to a bellcrank 46' which is actuated by the accelerator pedal A of the vehicle through means of a link 46", the wire 46 passing through a flexible tubular member 46a.

The lever 45 is normally urged to rotate in a counter-clockwise direction (see Figure 1) through the medium of a suitably provided spring 47. Swinging movement of the lever 45 in this direction is limited through the medium of a lug 48 that is engageable with that end of the bracket 38 to which the said lever 45 is pivoted as shown in Figure 1.

The lever 45 at the pivoted end thereof is provided with a catch 49 that is integral therewith, and cooperable with the catch 49 is a keeper lug 50 provided on that keeper-arm 42 that is connected through the medium of the link 43 with the arm 29, as before described, and as shown in Figure 1.

When the vehicle is in motion the valve 18 is in open position, as shown in Figures 1 and 4, so that the invention performs no function. However, when the driver wishes to stop the clutch and brake pedals are depressed, and when the clutch pedal is depressed, it moves the rod 33 is a direction to swing the arm 29 from the position shown in Figure 1 to that shown in Figure 2 and this movement of the arm causes the cam 22 to move to a position where it will permit the valve to close under the action of the spring 20, as shown in Figures 2 and 3. As the brakes have already been applied this closing of the valve 18 traps the air in the brakes and thus prevents the brakes from being released when the brake pedal is released. This movement of the arm 29 to the position shown in Figure 2 exerts a pull on link 43 which causes the link to swing the member 42 to the position shown in Figure 2 where the lug 50 is engaged by the keeper member 49 and thus the parts are held in the position shown in Figure 2 with the valve closed and the air trapped in the brakes of the wheels. Then when the vehicle is to be put in motion the brakes may be released at any time by depressing the foot accelerator A which causes the wire 46 to move the lever 45 in a position against the action of the spring 47 and to move the member 49 downwardly out of engagement with the lug 50 and this permits the spring 36 which has been compressed by forward movement of the arm 29 and the slide 31 to return the arm 29 and the parts associated therewith to the position shown in Figure 1. This return of the parts, of course, opens the valve 18 so that the invention ceases to function and the vehicle actuates in the same manner as if the invention was not in use.

It will also be apparent that the device in actual practice will be positive and efficient in operation and will assure positive holding of the brakes in applied position.

It is thought that a clear understanding of the construction, utility and advantages of an invention of this character will be had without a more detailed description.

Having described the invention, what is claimed as new is:

1. An attachment for the braking system of a motor vehicle comprising valve means located between the master cylinder of the braking system and the wheel brakes, spring means for normally holding the valve means in closed position to prevent return of the fluid from the wheel brakes to the master cylinder, cam means for controlling the valve means, means actuated by a depression of the clutch pedal of the vehicle to move the cam means to a position where the spring means will close the valve means, spring means for normally holding the cam means in a position to hold the valve means in open position, latch means for holding the parts with the cam means in valve closing position after the cam means have been moved by depression of the clutch pedal, an accelerator pedal, and means for releasing the latch means by depression of the accelerator pedal to permit the second-named spring means to return the cam means to a position holding the valve in open position.

2. An attachment for the fluid actuated braking system of a motor vehicle comprising a casing including a valve chamber and a cam chamber, a partition separating the two chambers and having a port therein, a spring-pressed valve in the valve chamber for closing the port, means for connecting the cam chamber with the master cylinder of the braking system, means for connecting the valve chamber with the wheel brakes, a cam in the cam chamber, an arm connected with the cam, means for connecting the arm with the clutch pedal of the vehicle, spring means associated with the connecting means for normally holding the cam in position to hold the valve open, such connecting means moving the cam to permit closing of the valve when the pedal is depressed, latch means for holding the parts in position with the valve closed, after the parts have been moved by depression of the pedal, an accelerator pedal and means for releasing the latch means by depression of the accelerator pedal to permit the spring means to return the parts to valve opening position.

JOHN A. LIBERATOSCIOLI.